3,129,197
COMPOSITIONS AND PROCESS FOR MANUFACTURING MOLDED RUBBER ARTICLES
Walter O. Farrell, Indianapolis, Ind., and Louis S. Verde, Tuckahoe, N.Y., assignors to H. Muehlstein & Co., Inc., New York, N.Y.
No Drawing. Filed Jan. 23, 1961, Ser. No. 83,928
11 Claims. (Cl. 260—41.5)

This invention relates to novel rubber compositions useful for the manufacture of molded hard rubber objects.

Hard rubber was first prepared by vulcanizing natural rubber with considerably more sulfur than had been used to vulcanize ordinary rubber products. The quantity of sulfur used had to be sufficient to saturate a majority of the double bonds present in the rubber. A typical hard rubber, for example, was prepared by vulcanizing 100 parts of rubber with from 30 to 50 parts of sulfur. Fillers, accelerators, process aids, etc. were customarily also present. As different varieties of synthetic rubbers became available, it was found that these could be substituted for natural rubber in hard rubber articles. Among the newer synthetic rubbers or elastomers which have been substituted for natural rubber in making hard rubber are polybutadiene, polyisoprene, butadiene-styrene co-polymer, butadiene-vinylpyridine co-polymer, butadiene-acrylonitrile co-polymer, and the like. The synthetic rubber most widely used is butadiene-styrene co-polymer, to be denominated hereinafter by its more common name, SBR.

Hard rubber compositions prepared only from sulfur and natural rubber are impractical since they are exceedingly slow to cure and are difficult to remove from the mold. Many processing aids and modifiers have to be added to the rubber-sulfur mixture in order to prepare a practical composition for molding such articles as battery cases, bottle cases, bowling balls, and the like. Some of these processing aids, particularly accelerators, add to the cost of the manufactured hard rubber article. Others, such as process oils and lubricants, while relatively inexpensive, tend to slow down the rate of cure of the molded hard rubber article and also to diminish its desirable qualities. In addition, the molding compositions used in preparing hard rubber articles, even with the addition of large quantities of processing aids, remain highly viscous, rubber-like compositions which are difficult to handle.

In general, little advantage as regards handling has derived from substituting synthetic elastomers for natural rubber latex since the molding compositions containing the synthetic elastomer are as viscous and rubbery as those derived from natural rubber.

It is an object of this invention to provide both liquid non-rubbery and granular non-cohesive compositions suitable liquid and granular compositions useful for the manufurther object of this invention to provide easily handleable liquid and granular compositions useful for the manufacture of hard rubber articles which compositions contain reduced amounts of processing aids such as process oils, etc. when compared with the compositions heretofore employed for that purpose.

In fulfillment of the above and other objects, this invention first provides compositions suitable for use in the manufacture of molded hard rubber articles comprising, in admixture, sulfur and a liquid butadiene-styrene, or SBR, co-polymer, said co-polymer having a viscosity in the range 30–15,000 poises at 45° C. In these compositions, we prefer to employ from about 20 to about 50 parts of sulfur per 100 parts of low viscosity SBR. The amount of sulfur used is generally determined by the butadiene content of the co-polymer, the higher the butadiene content the more sulfur required to saturate the double bonds of the co-polymer to form the desired hard rubber article. The liquid SBR co-polymer usually contains from about 60 to about 95 percent of butadiene, the remainder being styrene. The customary butadiene content is about 77 percent. In addition, the styrene employed in the formation of the co-polymer should have a minimal divinyl-benzene content. One or more polymerization modifiers, such as sulfones, are also present in the liquid SBR co-polymer in small quantities (5 percent by weight or less). These polymerization modifiers are used to keep the average co-polymer chain length low. While the polymerization modifiers are actually incorporated into the co-polymer chain, presumably as end groups, they do not affect the fundamental properties of the co-polymer. Furthermore, the incorporated modifier moieties are inert to further reaction with sulfur, and thus do not affect the process of manufacturing hard rubber articles. The term "liquid SBR" as used herein will be understood to mean a relatively short chain length butadiene-styrene co-polymer of the stated butadiene content and viscosity and containing up to 5 percent of a polymerization modifier.

Compositions having the above ratios of sulfur to liquid SBR are readily prepared by mixing the two ingredients in the desired proportions using only lightweight mixing equipment such as a double blade sigma-type mixer. The resulting composition is a viscous non-rubbery liquid suitable for injection molding or other molding process.

A second type of composition provided by this invention comprises a sulfur-liquid SBR composition, prepared as above, to which a filler has been added. These compositions include both viscous non-rubbery liquids and granular non-cohesive powders, depending upon the quantity and nature of the added filler. For example, a premix is prepared containing from about 20 to about 50 parts of sulfur to 100 parts of liquid SBR having a butadiene content of from about 60 to about 95 percent, the remainder being styrene, and a viscosity in the range of from 30–15,000 poises at 45° C. The premix can then be mixed with up to about 100 parts of an absorptive filler, such as hard rubber dust, or with up to about 300 parts of a non-absorptive filler, such as anthracite coal dust, and the resulting mixture will still maintain its liquid non-rubbery character, although as would be expected, its viscosity increases as more filler is added. However, when a liquid SBR-sulfur premix whose composition falls within the above ranges is mixed with from about 100 to about 600 parts of an absorptive-type filler, or with from about 300 to about 800 parts of an inert filler, a granular non-cohesive powder is produced. These powder compositions, because of their ease of handling, constitute a preferred embodiment of this invention.

Compositions having the above ingredients can also be prepared by mixing liquid SBR, sulfur and filler together still using lightweight mixing equipment.

As will be understood by those skilled in the art, the transition from viscous liquid to non-tacky powder produced by the continued addition of filler to the sulfur-liquid SBR premix, is not sudden but occurs over a small range, in which range the mixture has the consistency of library paste. While all mixtures of liquid SBR, sulfur and filler containing either less than 100 parts of an absorptive filler or less than 300 parts of a non-absorptive filler, remain liquid, compositions containing more than 100 parts of an absorptive filler or more than 300 parts of an inert filler, may still be liquid, depending upon the filler used. All the liquid compositions are, however, as previously stated, useful in making hard rubber articles. The preferred granular formulations contain in every instance at least 100 parts of an absorptive filler or at least 300 parts of a non-absorptive filler. All of the above compositions, whether liquid or powders or pastes, are included within the scope of this invention.

Absorptive fillers useful for mixing with sulfur and liquid SBR to form compositions according to this invention include hard rubber dust, woodflour, and the like. Useful inert or non-absorptive fillers include talc, anthracite coal dust, clay, whiting, magnesium silicate, silica, and the like. In addition, other filler materials such as cotton linters, rayon fibers, and chopped synthetic fibers made from polyamides, polyesters, polyacrylonitriles, and the like can also be used.

Liquid or granular compositions such as the above which are useful in the manufacture of hard rubber articles and which contain liquid SBR, sulfur, and a filler, as well as conventional additives, can be prepared using only lightweight mixing equipment instead of the two-roll differential mill or Banbury-type mixer necessarily used in preparing similar conventional compositions containing high-viscosity SBR, sulfur, processing aids, and a filler. Even if the resulting composition contains insufficient filler, either of the absorptive or inert type, to render it granular, the viscous liquid mixture of this invention can readily be placed in molds and then heated under pressure to form the desired hard rubber articles. If on the other hand, sufficient filler had been added to the sulfur-liquid SBR mixture to form a granular non-tacky powder, this powder can advantageously be conveyed automatically to large storage bins where it can be held indefinitely. Furthermore, such powder compositions are supremely well adapted for use in a continuous automatic molding operation, and are thus vastly superior to the rubber-like molding compositions presently employed in the manufacture of molded hard rubber articles. The granular compositions of this invention can also be preformed or prepositioned, operations obviously not suited to the viscous rubbery mixes of the past. For example, a granular non-cohesive powder prepared by mixing about 100 parts of liquid SBR, about 40 parts of sulfur, and about 300 parts of hard rubber dust, can be easily conveyed to the molding area (using automatic screw or pneumatic equipment) weighed and then deposited in a mold. The mold containing the mixture can then be heated under pressure to vulcanize the molded hard rubber article.

Additives are also customarily present in the compositions of this invention. The additives include those which are presently used in the preparation of hard rubber articles. Among such additives are vulcanization accelerators including inorganic accelerators such as lime, magnesia and the like, and organic accelerators such as aldehyde-amines, tetra ethyl thiuram disulfide, mercapto benzthiazole, and the like; aromatic, asphaltic or naphthenic process oils; fatty acid amines, etc. The accelerators and other additives are customarily present in our novel compositions in either the same or lesser amount than has been employed in the past in compositions suitable for the manufacture of hard rubber articles. A particular exception are process oils which are present in our hard rubber premix compositions in about one-half the concentration customarily used in conventional hard rubber premixes containing high viscosity SBR.

The quantities of accelerators, fatty acid amines, process oils, etc., which can be added to the liquid SBR-sulfur-filler combinations depend in general upon the nature and use of the hard rubber article which will ultimately be prepared from the molding composition. There are limits, however, to the amounts of any of the above materials which can be added to a given amount of liquid SBR-sulfur-filler combination. For example, using 100 parts of liquid SBR as a base line, accelerators such as lime can be present from 0 to 40 parts, and fatty acid amines or waxy lubricants from 0 to 10 parts. The process oils such as naphthenic oil, which are present in smaller amount than in conventional hard rubber, range from 0 to about 40 parts per 100 parts of liquid SBR. By way of illustration, the following chart gives, in the left-hand column, a typical hard rubber formulation suitable for the preparation of battery boxes using conventional high viscosity SBR, and in the right-hand column, a hard rubber formulation for the same purpose made in accordance with the teachings of this invention.

| Conventional Hard Rubber Stock | Parts | Novel Hard Rubber Stock | Parts |
|---|---|---|---|
| High viscosity SBR (Mooney ML212/4 =20–70) | 100 | Liquid SBR (400 poise viscosity) | 100 |
| Sulfur | 35 | Sulfur | 38 |
| Fatty acid amine | 1 | Fatty acid amine | 1 |
| Lime | 15 | Lime | 12 |
| Naphthenic oil | 50 | Naphthenic oil | 20 |
| 300 mesh anthracite coal dust | 500 | 300 mesh anthracite coal dust | 550 |

In preparing a formulation of the type exemplified in the above chart, a liquid premix is first prepared by mixing the low viscosity SBR containing 77 percent butadiene and 23 percent styrene, with sulfur as set forth hereinabove. The fatty acid amine, lime, naphthenic oil, and anthracite coal dust are then blended into the low viscosity SBR-sulfur mixture still using lightweight mixing equipment. The composition thus prepared is a granular, easily flowable powder which is readily adapted to an automatic molding operation. Alternatively, all the ingredients can be mixed together at one time, if desired.

If a liquid molding composition is desired, the amount of anthracite coal dust is decreased to 300 parts or less per 100 parts of liquid SBR. The liquid molding composition is prepared by employing the same lightweight mixing equipment used above to prepare granular molding compositions. The resulting molding composition is a viscous non-rubbery liquid which is also adapted for use in connection with automatic molding operations.

Although anthracite coal dust was employed as the filler in the above illustrative composition, other fillers, such as talc, clay, nylon or rayon fibers, hard rubber dust, etc. can be substituted for anthracite coal dust with a corresponding modification in the properties of the hard rubber articles formed therefrom. Likewise, varying the amount of filler causes changes in the properties of the finished hard rubber articles in much the same way that such variations in amount of filler modify the properties of conventional hard rubber articles.

In another embodiment of this invention, we have found that up to 40 percent of solid SBR can be substituted for the liquid low-viscosity SBR in the molding compositions of this invention without materially affecting their advantageous characteristics. The partial substitution of solid SBR for liquid SBR is made possible because liquid SBR is an excellent solvent for solid SBR. The incorporation of solid SBR into our molding compositions is relatively easy, it being only necessary to mix the solid SBR with the liquid SBR, using gentle stirring. Usually thinly-sheeted solid SBR is soaked with liquid SBR for about 24 hours before the premix is to be prepared. If more rapid incorporation is desired, it is, of course, possible to use conventional mixing equipment such as a Banbury mixer. The product thus obtained is a low-viscosity SBR, the viscosity being in the range 150–100,000 poises. Premix compositions prepared with an SBR of this viscosity have the following range of compositions:

.01 to 40 parts solid SBR
60 to 99.99 parts liquid SBR
20 to 50 parts sulfur

Various additives such as fillers, naphthenic oil, lime, fatty acid amine, etc. can also be incorporated into these premixes to yield a granular hard rubber molding stock similar to that prepared from liquid SBR alone.

The compositions of this invention are particularly useful in preparing hard rubber articles of manufacture which are less dense than those prepared from conventional hard rubber stock. An example of this type of article is a lightweight bowling ball core. Customarily, bowling ball cores are made from hard rubber and they have a specific gravity of about 1.32. This core is then surrounded with a ¾" to 1½" layer of another hard rubber compound of lower specific gravity. Standard bowling balls fabricated according to this process weigh about 16.0 pounds, and are not suitable for use by some women or by children since these persons require a bowling ball weighing from about 8 to about 15 pounds. The outer layer of both heavy and light bowling balls must have high impact strength, must be easily polished, and must be resistant to abrasion. Thus, the only feasible way to save weight in a bowling ball is to make a lighter core. To date, lightweight bowling ball cores, of apparent specific gravity .7 to 1.2 or thereabouts, have been made by mixing in a Banbury mixer, conventional hard rubber stock (specific gravity 1.2 to 1.3) with pieces of cork or other lightweight material. The resulting bowling ball core was more expensive than heavyweight cores because of the high cost of cork. Furthermore, these cores had a low impact strength because of a notch effect brought about by the presence of relatively large non-homogeneous cork particles.

By contrast, it is a relatively simple matter to prepare lightweight bowling ball cores from premixes falling within the scope of this invention. For example, a hard rubber premix stock having the following compositions:

100 parts of liquid SBR (400 poises, 77 percent butadiene content)
43 parts of sulfur
2 parts aldehyde-amine accelerator (aniline-butyraldehyde condensation product)
3 parts lime
280 parts hard rubber dust is prepared as set forth hereinabove. To prepare a bowling ball core weighing six pounds, six pounds of a granular, non-cohesive premix having the above composition are wighed into the two halves of the core mold, and the mold is clamped shut and is heated to about 280° F. for the about six hours in a steam-heated hydraulic press or other similar equipment. The six-hour heating period is a shorter time than is required for curing a bowling ball core manufactured from conventional hard rubber stock lightened with cork. Bowling ball cores weighing from 6–11 pounds can be made by the above process. Even lighter cores can be prepared by adding sodium bicarbonate or other similar blowing agents to force filling of the mold. Furthermore, the weight reducing ingredients used with conventional solid hard rubber stock, such as cork, can also be employed with the lesser amounts of our granular hard rubber stock to prepare extremely lightweight cores.

Bowling ball cores of standard weight can be also be made by the above process. Such cores are superior to those made from conventional hard rubber stock in that they are more uniform. Their manufacture is, of course, considerably simplified by using the processes and compositions of this invention.

Bowling ball cores made in accordance with the above procedure have a completely satisfactory impact strength comparable to that of conventional hard rubber cores and superior to cores made of hard rubber lightened with cork. The cores have a porous, fine grain structure which seems to eliminate the notch effect found with cork-lightened cores.

A further advantage of the use of our novel premix compositions in the manufacture of bowling ball cores lies in the ability to mold separate areas of the core with different densities, thus compensating in the core for the imbalance given a bowling ball by drilling finger holes through the outer layer into the core.

We claim:

1. A liquid hard rubber premix composition comprising from about 20 to about 50 parts of sulfur and from about .01 to about 300 parts of a filler non-absorptive for styrene-butadiene copolymer per 100 parts of a liquid styrene-butadiene copolymer having a viscosity in the range of 30–15,000 poises at 45° C. and a butadiene content from about 60 to about 95 percent by weight.

2. A liquid hard rubber molding composition comprising from about 20 to about 50 parts of sulfur and from about .01 to about 100 parts of a filler absorptive for styrene-butadiene copolymer per 100 parts of a liquid styrene-butadiene copolymer having a viscosity in the range of 30 to 15,000 poises at 45° C. and a butadiene content from about 60 to about 95 percent by weight.

3. A granular non-cohesive flowable hard rubber molding composition comprising from about 20 to about 50 parts of sulfur and from about 300 to about 800 parts of a filler non-absorptive for styrene-butadiene copolymer per 100 parts of a liquid styrene-butadiene copolymer having a viscosity in the range of 30–15,000 poises at 45° C. and a butadiene content from about 60 to about 95 percent by weight.

4. A granular non-cohesive flowable hard rubber premix composition comprising from about 20 to about 50 parts of sulfur and from about 100 to about 600 parts of a filler absorptive for styrene-butadiene copolymer per 100 parts of a liquid styrene-butadiene copolymer having a viscosity in the range of 30–15,000 poises at 45° C. and a butadiene content from about 60 to about 95 percent by weight.

5. A hard rubber article of manufacture prepared by curing a composition comprising from about 20 to about 50 parts of sulfur and from about .01 to about 800 parts of a filler per 100 parts of liquid styrene-butadiene copolymer having a viscosity in the range 20–15,000 poises at 45° C. and a butadiene content from about 60 to about 95 percent by weight.

6. The method of manufacturing hard rubber articles which comprises depositing in a mold a weighed amount of a hard rubber molding composition comprising from about 20 to about 50 parts of sulfur and from about .01 to about 800 parts of a filler per 100 parts of a liquid styrene-butadiene copolymer having a viscosity in the range 30–15,000 poises at 45° C. and a butadiene content from about 60 to about 95 percent by weight, and then curing the hard rubber stock by heating the mold under pressure.

7. The method of manufacturing light weight bowling ball cores which comprises depositing into a core mold from 6–11 pounds of a granular hard rubber molding composition comprising about 20 to about 50 parts of sulfur from each 100 parts of a low viscosity styrene-butadiene copolymer having a viscosity in the range 30–15,000 poises at 45° C. and a butadiene content about 60 to about 95 percent by weight and from about 100 to about 800 parts of a filler; curing the hard rubber composition by heating the core mold under heat and pressure; and then removing the core from the mold.

8. A bowling ball core comprising from 13 to 50 percent of a mixture having from about 20 to about 50 parts of sulfur per 100 parts of a low viscosity styrene-butadiene copolymer having a viscosity in the range 30–15,000 poises at 45° C. and a butadiene content of from about 60 to about 95 percent by weight and from 50 to 87 percent of a filler.

9. A composition consisting of about 20 to about 50 parts of sulfur, .01 to 800 parts of a filler, and 100 parts of styrene-butadiene copolymer mixture containing about .01 to about 40 percent of solid styrene-butadiene copolymer and about 60 to about 99.99 percent liquid styrene-butadiene copolymer, said styrene-butadiene copolymer mixture having a viscosity in the range 150–100,000 poises at 45° C.

10. A liquid hard rubber premix composition comprising from about 20 to about 50 parts of sulfur and from about .01 to about 300 parts of a filler per 100 parts of a liquid styrene-butadiene coplymer having a viscosity in the range of 30–15,000 poises at 45° C. and a butadiene content from about 60 to about 95 percent by weight.

11. A granular non-cohesive flowable hard rubber molding composition comprising from about 20 to about 50 parts of sulfur and from about 100 to about 800 parts of a filler per 100 parts of a liquid styrene-butadiene copolymer having a viscosity in the range of 30–15,000 poises at 45° C. and a butadiene content from about 60 to about 95 percent by weight.

References Cited in the file of this patent

UNITED STATES PATENTS

| | | |
|---|---|---|
| 2,638,456 | Laning | May 12, 1953 |
| 2,721,185 | Schulze et al. | Oct. 18, 1955 |
| 2,883,358 | Gentry et al. | Apr. 21, 1959 |